US007809823B2

(12) United States Patent
Sankaran et al.

(10) Patent No.: US 7,809,823 B2
(45) Date of Patent: *Oct. 5, 2010

(54) METHODS, SYSTEMS, AND PRODUCTS FOR VERIFYING INTEGRITY OF WEB-SERVER SERVED CONTENT

(75) Inventors: Karthiksundar Sankaran, Alpharetta, GA (US); Zakir Patrawala, Atlanta, GA (US); Timothy A. Hill, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/106,359

(22) Filed: Apr. 21, 2008

(65) Prior Publication Data

US 2008/0222459 A1 Sep. 11, 2008

Related U.S. Application Data

(63) Continuation of application No. 10/813,474, filed on Mar. 30, 2004, now Pat. No. 7,363,364.

(51) Int. Cl.
*G06F 15/173* (2006.01)
(52) U.S. Cl. .................................... 709/223
(58) Field of Classification Search ................ 709/223; 714/2
See application file for complete search history.

(56) References Cited

U.S. PATENT DOCUMENTS

| | | | |
|---|---|---|---|
| 5,732,218 A | 3/1998 | Alan | |
| 5,870,559 A | 2/1999 | Leshem | |
| 5,926,463 A | 7/1999 | Ahearn | |
| 5,938,729 A | 8/1999 | Cote | |
| 5,958,010 A | 9/1999 | Agarwal | |
| 5,974,445 A | 10/1999 | Pivnichny et al. | |
| 6,018,619 A | 1/2000 | Allard | |
| 6,026,379 A | 2/2000 | Haller | |
| 6,138,157 A | 10/2000 | Welter | |
| 6,253,324 B1 | 6/2001 | Field et al. | |
| 6,398,105 B2 * | 6/2002 | Ramberg et al. | 235/375 |
| 6,434,598 B1 * | 8/2002 | Gish | 709/203 |
| 6,484,203 B1 | 11/2002 | Porras et al. | |
| 6,523,027 B1 | 2/2003 | Underwood | |
| 6,539,370 B1 | 3/2003 | Chang | |
| 6,546,507 B1 | 4/2003 | Coyle et al. | |
| 6,564,342 B2 | 5/2003 | Landan | |
| 6,601,066 B1 | 7/2003 | Davis-Hall | |
| 6,629,144 B1 * | 9/2003 | Chu et al. | 709/227 |
| 6,631,408 B1 | 10/2003 | Welter et al. | |
| 6,631,411 B1 | 10/2003 | Welter | |
| 6,647,389 B1 | 11/2003 | Fitch | |
| 6,671,844 B1 | 12/2003 | Krech et al. | |
| 6,711,615 B2 | 3/2004 | Porras et al. | |
| 6,738,933 B2 * | 5/2004 | Fraenkel et al. | 714/47 |
| 6,772,208 B1 | 8/2004 | Dutta | |

(Continued)

*Primary Examiner*—David Y Eng
(74) *Attorney, Agent, or Firm*—Scott P. Zimmerman PLLC

(57) ABSTRACT

Methods, systems, and products are disclosed for verifying the integrity of web server content. A client-side integrity verification of a web page communicated from a web server to a client computer is received. A server-side error in the web page is received from the web server. The results of the client-side integrity verification are merged with the server-side error. The results of the client-side integrity verification and the server-side error are presented.

21 Claims, 4 Drawing Sheets

U.S. PATENT DOCUMENTS

| | | |
|---|---|---|
| 6,834,364 B2 | 12/2004 | Krech et al. |
| 6,845,394 B2 * | 1/2005 | Ritche ........................ 709/221 |
| 6,895,551 B1 | 5/2005 | Huang et al. |
| 7,120,572 B1 | 10/2006 | Liang |
| 7,146,402 B2 * | 12/2006 | Kucherawy ................. 709/206 |
| 7,171,672 B2 * | 1/2007 | Just ............................ 719/330 |
| 7,240,192 B1 * | 7/2007 | Paya et al. .................. 713/152 |
| 7,249,155 B1 * | 7/2007 | Pestoni ....................... 709/203 |
| 7,363,364 B2 * | 4/2008 | Sankaran et al. ............ 709/223 |
| 7,401,129 B2 * | 7/2008 | Negishi et al. .............. 709/219 |
| 7,426,556 B2 | 9/2008 | Sankaran et al. |
| 2002/0097268 A1 | 7/2002 | Dunn et al. |
| 2002/0116491 A1 | 8/2002 | Boyd |
| 2002/0156799 A1 | 10/2002 | Markel et al. |
| 2002/0173857 A1 | 11/2002 | Pabari |
| 2002/0184363 A1 | 12/2002 | Viavant |
| 2003/0084143 A1 | 5/2003 | Knoesel |
| 2003/0115266 A1 | 6/2003 | Sweet |
| 2003/0221000 A1 | 11/2003 | Cherkasova |
| 2003/0229677 A1 | 12/2003 | Allan |

* cited by examiner

METHODS, SYSTEMS, AND PRODUCTS FOR VERIFYING INTEGRITY OF WEB-SERVER SERVED CONTENT

CROSS-REFERENCE TO RELATED APPLICATIONS

This application is a continuation of U.S. application Ser. No. 10/813,474, filed Mar. 30, 2004, now issued as U.S. Pat. No. 7,363,364, and incorporated herein by reference in its entirety.

This application also relates to U.S. application Ser. No. 10/813,492, filed Mar. 30, 2004 and now issued as U.S. Pat. No. 7,216,256, and U.S. application Ser. No. 10/813,475, filed Mar. 30, 2004 and now issued as U.S. Pat. No. 7,426,556, with both applications incorporated herein by reference in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to electrical computers and, more particularly, to data processing system error/fault handling and to multicomputer data transferring.

2. Description of the Related Art

Broken web links are a common problem in the Internet industry. Internet web pages are electronic documents that are retrieved from a web server. A Uniform Resource Locator (URL) identifies the server that stores/hosts the web page. These web pages, however, may themselves contain embedded links to additional content. When a web page is retrieved from the web server, all the component parts linked to that web page should also be retrievable. Often times, however, one or more links to additional content are broken. That is, when the web page is retrieved, one or more of the embedded links refer to non-existent web pages or web pages with errors. Sometimes the embedded URL address is incorrectly typed. Sometimes the servers storing the embedded content is malfunctioning or not available. Sometimes the servers serve partial pages due to components of the server code malfunctioning. Most times, however, the document located by the embedded URL is no longer stored on the web server. A failed embedded link often results in the familiar Error 404 "Page Not Found." When an embedded links fails, components are missing and the integrity of the web page is lost. The user requesting the web page is frustrated, and the web master responsible for the web page is frustrated. There is, accordingly, a need in the art for methods, systems, and products for verifying the integrity of content served by web servers.

BRIEF SUMMARY OF THE INVENTION

The aforementioned problems, and other problems, are reduced by this invention. This invention comprises methods, computer systems, computer programs, and computer program products that verify the integrity of web content. This invention analyzes integrity using a client-resident integrity checking tool and a server-resident integrity checking tool. This invention then combines the results of each integrity checking tool to systematically and to thoroughly discover broken links. Due to the volume of content being served by web servers, usually there is more than one server serving the same content in what are called "web farms." Certain intermittent errors, caused by a failure of a server in the web farm, are difficult to find with server-only or client-only methods. By combining the results from both client and server side tools this invention provides a way to precisely identify these intermittent errors and enhances the quality of service. These broken links destroy the integrity of a web resource provided by a web server. This invention thus enables the user (such as an administrator and/or a web master) to present documents and content that are complete and without missing parts. If a web site has broken links to non-existing content, the customer has a poor experience and can become frustrated with the web site. These broken links may even cause some customers to choose another web site for goods and services. This invention, then, helps maintain a high quality web site that pleases and retains customers.

This invention discloses methods, systems, and products for verifying the integrity of web server content. One of the embodiments describes a combined client-resident and server-resident content-integrity tool that helps identify integrity problems. One method receives results from a client-resident integrity program and from a server-resident integrity program. The client-resident integrity program operates on a client computer, while the server-resident integrity program operates on a web server. This invention merges the results from the client-resident integrity program and from the server-resident integrity program. The merged results are then presented at a computer system.

Other embodiments of this invention describe a system for verifying the integrity of web server content. The system comprises an Integrity Module stored in a memory device, and a processor communicating with the memory device. The Integrity Module receives results from a client-resident integrity program operating on a client computer. The client-resident integrity program verifies integrity of a web resource communicated from a web server to the client computer. The Integrity Module also receives results from a server-resident integrity program operating on the web server. The Integrity Module merges the results of the client-resident integrity program and the server-resident integrity program. The Integrity Module also visually and/or audibly presents the merged results at a computer system.

Other embodiments of this invention describe a computer program product. A computer-readable medium stores an Integrity Module. The Integrity Module receives results from a client-resident integrity program and from a server-resident integrity program. The client-resident integrity program operates on a client computer and verifies the integrity of a web resource communicated from a web server to the client computer. The Integrity Module merges the results of the client-resident integrity program and the server-resident integrity program and presents the merged results at a computer system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

Figure 1:
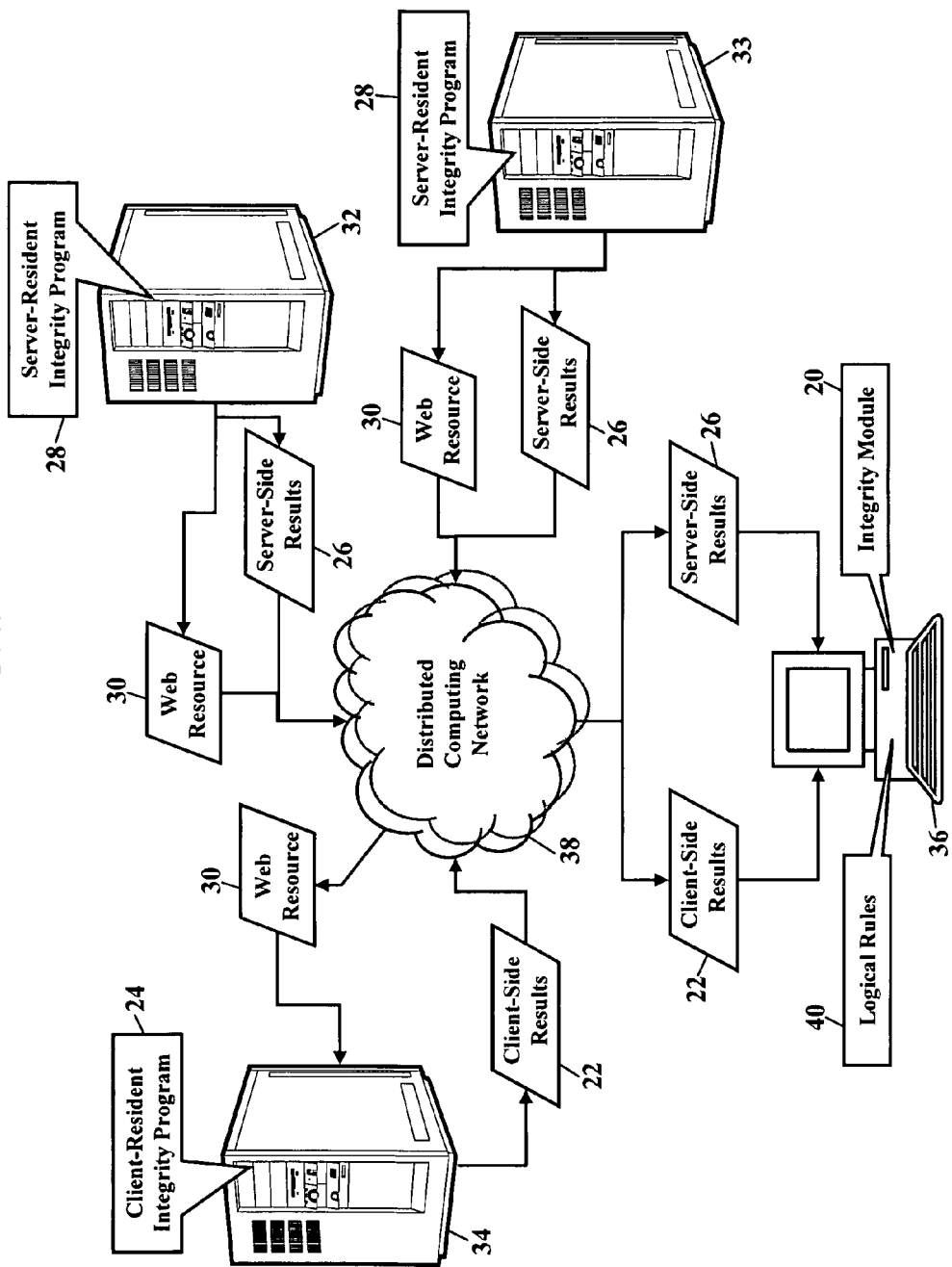
FIG. 1 is a schematic illustrating the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention verifies the integrity of web content. This invention analyzes integrity using a client-resident integrity checking tool and a server-resident integrity checking tool. This invention then combines the results of each integrity checking tool to systematically and to thoroughly discover broken links. These broken links destroy the integrity of a web resource provided by a web server. This invention thus allows a user (such as an administrator and/or a web master) to present documents and content that are complete and without missing parts. If a web site has broken links to non-existing content, the customer has a poor experience and can become frustrated with the web site. These broken links may even cause some customers to choose another web site for goods and services. This invention, then, helps maintain a high quality web site that pleases and retains customers.

This invention provides a more thorough integrity analysis. This invention is the first software product that allows a client-resident integrity checking tool and a server-resident integrity checking tool to cooperate. That is, this invention merges the output from each separate operation to provide a complete integrity analysis. A user of this invention may thus view any errors, conditions, and/or events detected by either the client-resident integrity checking tool or the server-resident integrity checking tool. This invention may be configured to run at any time or even multiple times per day. When any type of integrity error is detected, the invention may even be configured to prominently present that integrity error. This invention, then, detects any number of errors that may identify integrity errors. The user of this invention may then quickly repair these errors to maintain the integrity of the web site.

FIG. 1 is a schematic illustrating this invention. The embodiments of this invention include an Integrity Module 20. The Integrity Module 20 comprises methods, systems, computer programs, and/or computer program products that verify static and dynamically-generated web server content. The Integrity Module 20 receives client-side results 22 from a client-resident integrity program 24. The Integrity Module 20 also receives server-side results 26 from a server-resident integrity program 28. The client-resident integrity program 24 verifies the integrity of a web resource 30 communicated from one or more web servers 32 and 33 to a client computer 34. The server-resident integrity program 28 helps identify server-side errors that cause broken web links. The Integrity Module 20 merges these results, sorts these results, and then visually/audibly presents these results to a user at a user computer 36. As the following paragraphs explain, the Integrity Module 20 reports integrity errors in the web resource 30. The user at the user computer 36 may then use the Integrity Module 20 to identify and to resolve these integrity errors.

The Integrity Module 20 communicates via a distributed computing network 38. The distributed computing network 38 may include the Internet (sometimes alternatively known as the "World Wide Web"), an intranet, a local-area network (LAN), and/or a wide-area network (WAN). The Integrity Module 20 operates within any computer system, such as the user computer 36. The client-resident integrity program 24 operates within any computer system, such as the client computer 34. The server-resident integrity program 28 also operates within any computer system, such as the web servers 32 and 33. Due to the volume of content being served by web servers, the web servers 32 and 33 illustrate the server-resident integrity program 28 operating in multiple servers in a web farm. The Integrity Module 20 receives the client-side results 22 via the distributed computing network 38. The Integrity Module 20 also receives the server-side results 26 via the distributed computing network 28. Once the client-side results 22 and the server-side results 26 are received, the Integrity Module 20 arranges and presents the results for user at the user computer 36.

The client-resident integrity program 24 and the server-resident integrity program 26 are not described in detail. If the reader desires a more detailed explanation of the client-resident integrity program 24, the reader is directed to the concurrently filed and commonly-assigned U.S. application Ser. No. 10/813,492, incorporated herein by reference in its entirety. The server-resident integrity program 26, similarly, is not further described. If the reader desires a more detailed explanation of the server-resident integrity program 26, the reader is directed to the concurrently filed and commonly-assigned U.S. application Ser. No. 10/813,475, incorporated herein by reference in its entirety.

The Integrity Module 20 arranges and presents the results. The Integrity Module 20 receives the client-side results 22 via the distributed computing network 38. The Integrity Module 20 also receives the server-side results 26 via the distributed computing network 28. Once the client-side results 22 and the server-side results 26 are received, the Integrity Module 20 merges, sorts, and presents the results at the user computer 36. The Integrity Module 20 may invoke various logical rules 40 when sorting and when presenting the merged results. These logical rules 40 are stored within the user computer 36 in a system memory device (such as a memory subsystem, flash memory, or a peripheral storage device). The logical rules 40, however, may alternatively or additionally be remotely stored and accessed via the distributed computing network 28. The terms "reports" and "presents" means the Integrity Module 20 displays the merged results on a display device (e.g., computer display, personal data assistant, cell phone, or other communications device). The terms "reports" and "presents" may also mean the Integrity Module 20 prints a hardcopy of the merged results. The terms "reports" and "presents," however, may mean the Integrity Module 20 stores the merged results for retrieval.

The Integrity Module 20 uses the logical rules 40 to sort the merged results. The logical rules 40 can be written to report any condition, occurrence, and/or event that may indicate an integrity error. If, for example, the client-side results 22 and/or the server-side results 26 indicate an error message was found, this error message may indicate the existence of a partial page error. The logical rules 40, then, might instruct the Integrity Module 20 to prominently present and/or report the results associated with this error message. The logical rules 40 might also instruct the Integrity Module 20 to sort the merged results according to the error message. The logical rules 40 may instruct the Integrity Module 20 to sort the merged results according to a referring Uniform Resource Locator and/or a requested Uniform Resource Locator. If the file size of the web resource 30 is smaller than expected, the logical rules 40 may instruct the Integrity Module 20 to present/report an error. If the client-side results 22 and/or the server-side results 26 indicate a failed communication link with the web server 32, the logical rules 40 might instruct the Integrity Module 20 to prominently present the communication error. If either the client-side results 22 or the server-side results 26 indicate an error, the logical rules 40 might instruct the Integrity Module 20 to sort and to present the results according to a status code associated with the web resource 30. However the logical rules 40 are specified, the Integrity Module 20 can produce/present/report complete details of any condition, occurrence, and/or event that may indicate an integrity error.

Figure 2:
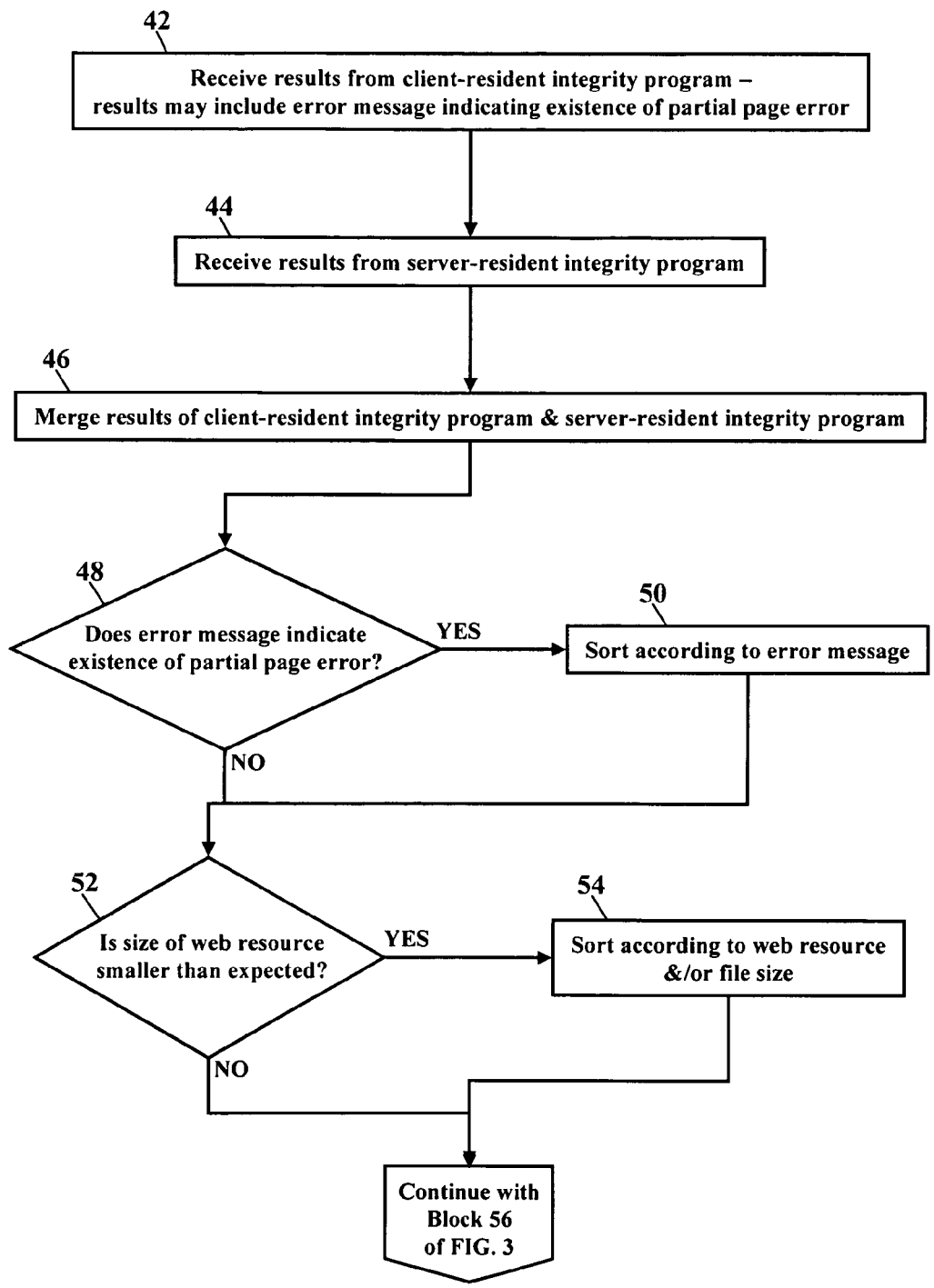
FIGS. 2-4 are flowcharts illustrating a method of verifying the integrity of web server content, according to the embodiments of this invention.

FIG. 2 is a flowchart illustrating a method of verifying the integrity of web server content. Results from a client-resident integrity program are received (Block 42). The results from the client-resident integrity program may include an error message indicating existence of a partial page error. Results from a server-resident integrity program are also received (Block 44). The results of the client-resident integrity program and the server-resident integrity program are merged (Block 46). If the error message indicates the existence of a partial page error (Block 48), then the merged results are sorted according to the error message (Block 50). If the size of a web resource is smaller than expected (Block 52), then the merged results are sorted according to the web resource and/or the file size (Block 54).

Figure 3:
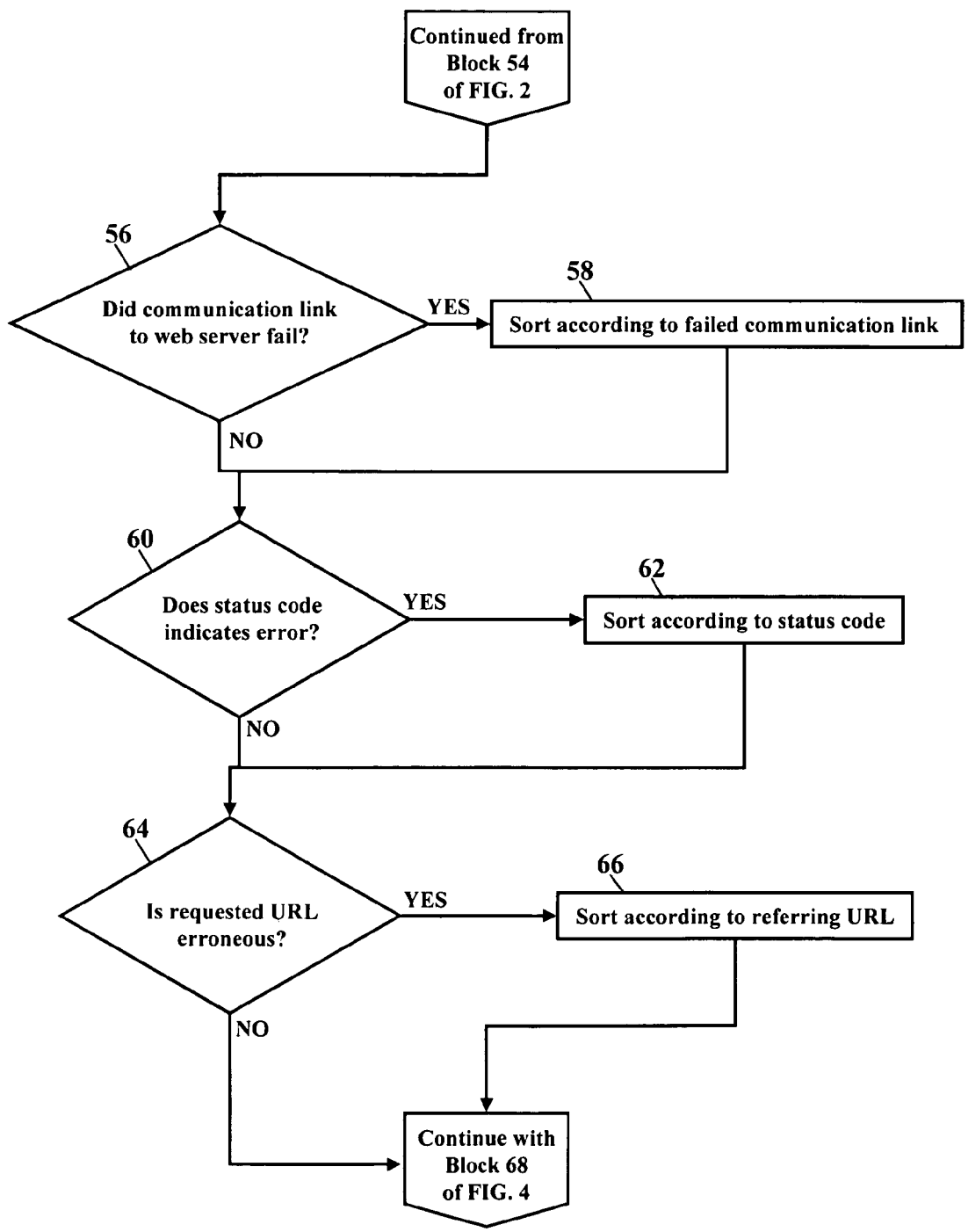
Figure 4:
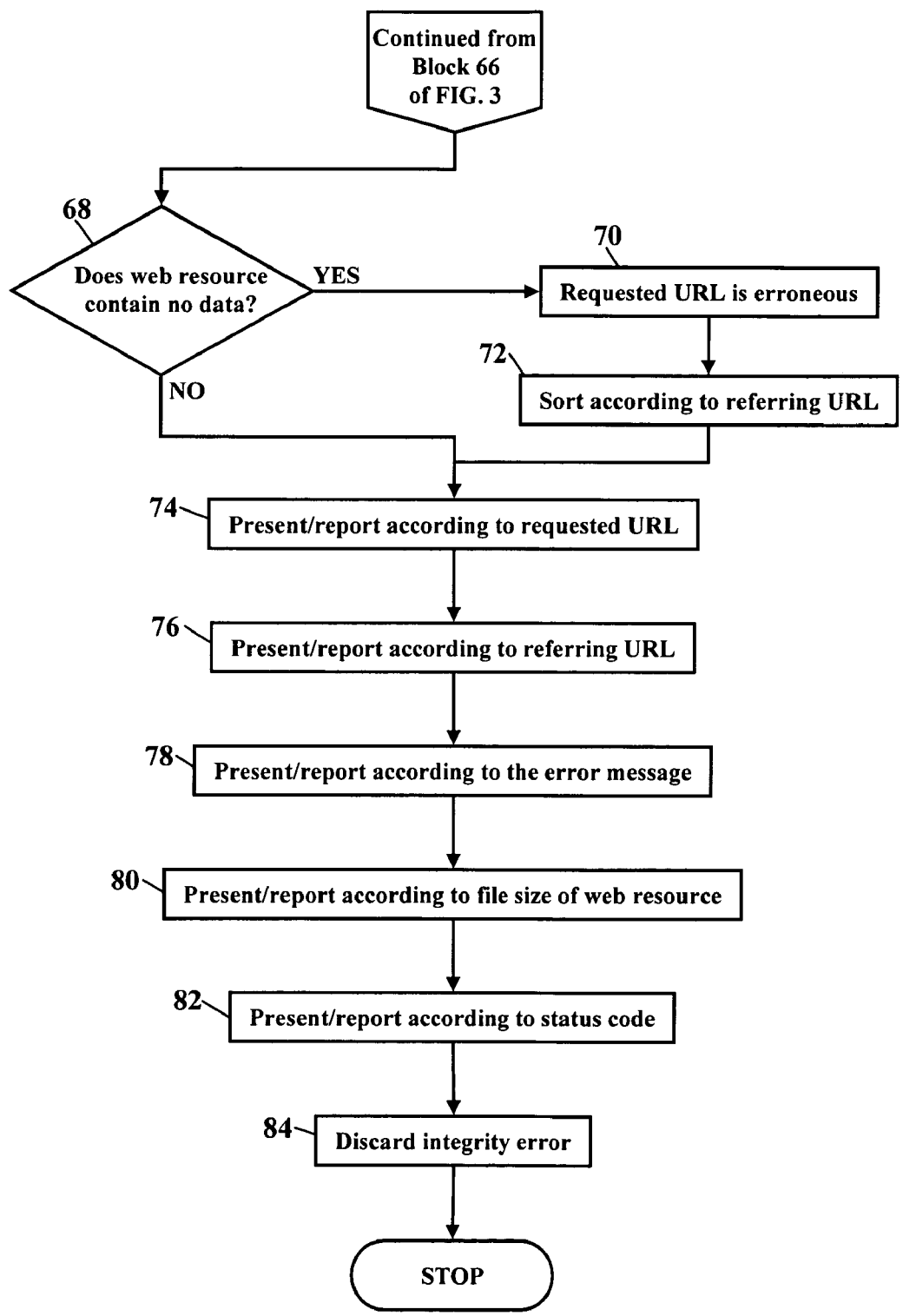

The flowchart continues with FIGS. 3 and 4. If a communication link to a web server fails (Block 56), then the merged results are sorted according to the failed communication link (Block 58). If a status code indicates an error (Block 60), then the merged results are sorted according to the status code (Block 62). If a requested Uniform Resource Locator ("URL") is erroneous (Block 64), then the merged results are sorted according to a referring Uniform Resource Locator ("URL") (Block 66). If the web resource contains no data (Block 68 of FIG. 4), then the requested Uniform Resource Locator ("URL") is erroneous (Block 70) and the merged results are sorted according to a referring Uniform Resource Locator ("URL") (Block 72). The merged data may then be presented/reported according to the requested Uniform Resource Locator ("URL") (Block 74), the referring Uniform Resource Locator ("URL") (Block 76), the error message (Block 78), the file size of the web resource (Block 80), and/or the status code (Block 82). Once the integrity error is detected, the user may repair the error and then discard the integrity error from future reports (Block 84). The user may thus eliminate repeatedly reporting the same integrity error even though repaired.

The Integrity Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Integrity Module to be easily disseminated. A computer program product for verifying the integrity of web server content includes the Integrity Module stored on the computer-readable medium. The Integrity Module receives results from a client-resident integrity program operating on a client computer. The client-resident integrity program verifies the integrity of a web resource communicated from a web server to the client computer. The Integrity Module also receives results from a server-resident integrity program operating on the web server. The Integrity Module merges the results of the client-resident integrity program and the server-resident integrity program and presents the merged results at a computer system.

The Integrity Module may also be physically embodied on or in any addressable (e.g., HTTP, I.E.E.E. 802.11, Wireless Application Protocol (WAP)) wireline or wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
   receiving a client-side integrity verification of a web page performed by a client computer;
   receiving a server-side error in the web page identified by a web server;
   merging the client-side integrity verification with the server-side error;
   sorting the merger of the client-side integrity verification and the server-side error to indicate a partial page error in the web page; and presenting the merger of the client-side integrity verification and the server-side error to identify a problem in the web page.

2. The method according to claim 1, further comprising indicating an existence of a partial page error in the web page.

3. The method according to claim 1, further comprising sorting the merger according to a referring Uniform Resource Locator.

4. The method according to claim 1, further comprising sorting the merger of the client-side integrity verification and the server-side error according to a requested Uniform Resource Locator.

5. The method according to claim 1, further comprising presenting an error that indicates a failed communication link with the web server.

6. The method according to claim 1, further comprising sorting the merger of the client-side integrity verification and the server-side error according to the server-side error.

7. The method according to claim 1, further comprising reporting an error when a file size of the web page is smaller than expected.

8. The method according to claim 1, further comprising sorting the merger of the client-side integrity verification and the server-side error according to a status code that indicates an error.

9. The method according to claim 1, further comprising sorting the merger of the client-side integrity verification and the server-side error according to a referring Uniform Resource Locator when a requested Uniform Resource Locator is erroneous.

10. The method according to claim 1, further comprising sorting the merger of the client-side integrity verification and the server-side error according to a referring Uniform Resource Locator when the web resource contains no data, indicating a requested Uniform Resource Locator is erroneous.

11. The method according to claim 10, further comprising presenting the merger of the client-side integrity verification and the server-side error according to at least one of the referring Uniform Resource Locator, an error message, a file size of the web resource, and a status code.

12. A system, comprising:
a processor executing code stored in memory that causes the processor to:
receive a client-side integrity verification of a web page performed by a client computer;
receive a server-side error in the web page identified by a web server;
merge the client-side integrity verification with the server-side error;
sort the merger of the client-side integrity verification and the server-side error to indicate a partial page error in the web page; and
display the merger of the client-side integrity verification and the server-side error to resolve the partial page error.

13. The system according to claim 12, wherein the code further causes the processor to retrieve a logical rule describing the partial page error.

14. The system according to claim 12, wherein the code further causes the processor to sort the merger according to a referring Uniform Resource Locator.

15. The system according to claim 12, wherein the code further causes the processor to sort the merger according to a requested Uniform Resource Locator.

16. The system according to claim 12, wherein the code further causes the processor to present an error that indicates a failed communication link with the web server.

17. The system according to claim 12, wherein the code further causes the processor to sort the merger according to the server-side error.

18. A computer readable medium storing processor executable instructions for performing a method, the method comprising:
receiving a client-side integrity verification of a web page performed by a client computer;
receiving a server-side error in the web page identified by a web server;
merging the client-side integrity verification with the server-side error;
sorting the merger of the client-side integrity verification and the server-side error to indicate a partial page error in the web page; and
display the merger of the client-side integrity verification and the server-side error to resolve the partial page error.

19. The computer readable medium according to claim 17, further comprising instructions for reporting an error when a file size of the web page is smaller than expected.

20. The computer readable medium according to claim 17, further comprising instructions for sorting the merger according to a status code that indicates an error.

21. The computer readable medium according to claim 17, further comprising instructions for sorting the merger according to a referring Uniform Resource Locator when a requested Uniform Resource Locator is erroneous.

* * * * *